UNITED STATES PATENT OFFICE.

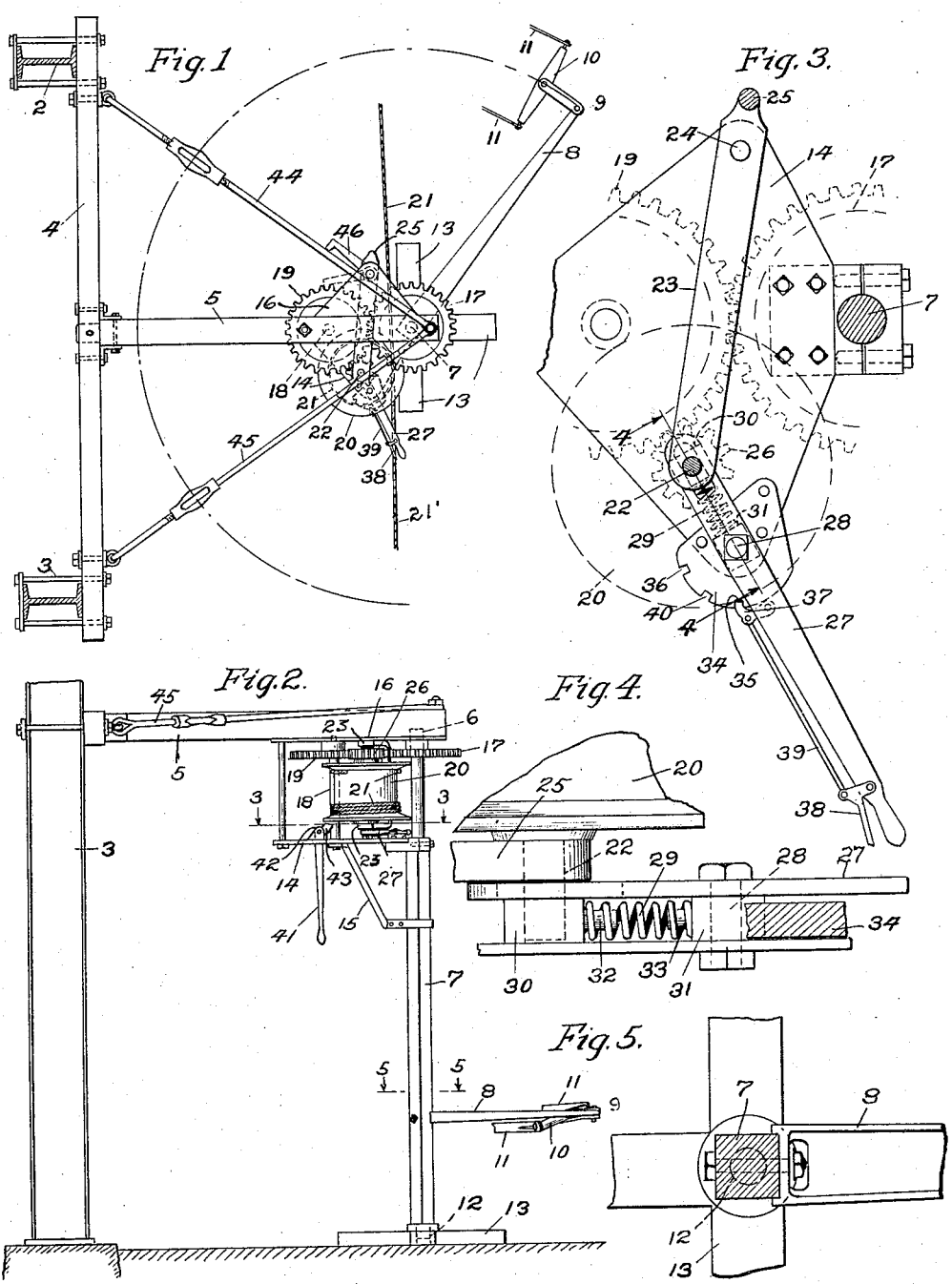

JOHN A. ANDERSON AND OSCAR T. FERNGREN, OF CHICAGO, ILLINOIS.

HOISTING APPARATUS.

1,149,612.   Specification of Letters Patent.   Patented Aug. 10, 1915.

Application filed January 29, 1912. Serial No. 674,139.

*To all whom it may concern:*

Be it known that we, JOHN A. ANDERSON, a subject of the King of Sweden, and OSCAR T. FERNGREN, a citizen of the United States, both residents of Chicago, in the county of Cook and State of Illinois, have invented certain new and useful Improvements in Hoisting Apparatus, of which the following is a specification.

Our invention relates to elevating devices and has particular reference to hoists for building materials. Such hoists are usually operated by horse-power, a horse being hitched to a rope passing over suitable pulleys and connected with the car of the hoist. In elevating the car and its load the horse is driven in a straight line the necessary distance and then returns "empty" to the starting point.

The object of the present invention is to save the time lost in such operation and to enable the draft animal to travel in an endless path or a circle, as around a capstan, for both the elevating and lowering of loads. For this purpose a mechanism is provided for rotating the drum on which the elevator rope or cable is wound in either direction without changing the direction of travel of the animal serving as the power. Provision is also made for uncoupling the power and lowering the hoist or car under control of a brake-mechanism.

With the above-named objects in view our invention consists in the novel construction, combination and arrangement of parts hereinafter described in detail, illustrated in the accompanying drawing and incorporated in the appended claims.

In the drawing, Figure 1 is a plan view, partly broken away, of a hoisting device embodying our invention. Fig. 2 is a side elevation thereof. Fig. 3, is an enlarged section taken substantially on line 3—3 of Fig. 2. Fig. 4 is a section taken substantially on line 4—4 of Fig. 3. Fig. 5 is a section on an enlarged scale taken substantially on line 5—5 of Fig. 2.

In the several views 2 and 3 represent vertical beams of any suitable form, or such as may be found in a building in course of construction, and 4 is a horizontal cross-beam secured to the beams 2 and 3 in any suitable manner. Secured to and extending at right angles from the beam 4 is a beam 5 in the outer end, or at 6, of which is the upper bearing for a rotatively mounted post or shaft 7 to which is secured one end of a horizontal pole 8. To the outer end 9 of the latter is coupled a double or single tree 10 to which traces 11, 11 of the harness of a horse or other draft animal may be hitched. The lower end of the post 7 is pivotally mounted at 12 in a base 13. On the post 7, near its upper end, is mounted a platform 14 supported in part by one or more struts or braces 15 extending angularly from post to platform as shown in Fig. 2. In this platform are the lower bearings for a series of vertical shafts for the hoisting mechanism. A similar platform of any suitable design is provided at 16 for the upper bearings of said vertical shafts.

On the post or shaft 7 is keyed a large gear-wheel 17 and on a vertical shaft 18 journaled in the platforms 14 and 16 is a similar gear-wheel 19 which is always in mesh with the wheel 17. A drum 20, on which the cable or rope 21 for the hoist is wound, is mounted on a vertical shaft 22. The latter shaft is mounted in the swinging ends of a frame or yoke 23 mounted on a shaft 24 having its bearings also in the platforms 14 and 16. The frame or yoke 23 is simply a pair of horizontal bars, one of which is shown in Fig. 3, connected by a vertical portion 25. On the shaft 22 on which the drum 20 is keyed is also keyed, immediately above the drum, as shown in Fig. 2, a smaller gear-wheel or pinion 26. The load-end of a lever 27, fulcrumed at 28 on the platform 14, is pivotally connected with the shaft 22 carrying the drum 20 and gear-wheel 26. By means of this lever the small wheel 26 is thus, together with the drum, swung on the center 28 to engage the gear-wheel 26 with either the wheel 17 or the wheel 19. For the purpose of holding the smaller wheel 26 in mesh with either of the larger wheels a spring 29 is interposed between a bearing-block 30 on the axis 22 and a similar bearing-block 31 on the axis 28, these blocks being, respectively, provided with studs 32 and 33 which enter the ends of the coiled spring 29 and hold it in position against the blocks. The bearing-block 30 is mounted on the lever 27 for limited movement toward and from the bearing-block 31. It will be noted by reference to Fig. 3 that the pressure of the spring 29 will be at an angle away from a center line passing through the centers 24 and 28 whether the gear 26 meshes with the gear 19 as in Fig. 3 or with the gear 17. The lever 27 may also be unyieldingly locked against a swinging movement by means of a quadrant 34 provided with a notch 35 for the wheel 19 and a notch 36 for the wheel 17. These notches are in turn engaged by a detent 37 pivoted on the lever 27. The detent is operated in the usual manner by a finger-lever 38 connected with the detent by a rod 39. An intermediate notch 40 is provided for holding the small wheel 26 out of engagement with both wheels 17 and 19, in which event the hoisting mechanism will be free from the power. When thus freed the hoist may be lowered more rapidly with the aid of a brake-lever 41 fulcrumed on the platform 14 at 42 and provided with a brake-shoe 43 which is caused to bear against the lower end of the drum 20.

44 and 45 are truss-rods which support the beam 5 against swinging movement. The mechanism may be more positively locked against movement, as for the purpose of holding a load stationary at any given position, by means of a hook 46 which is shown in Fig. 1 adapted to engage the large wheel 19.

In operation the rope or cable usually carries a car on each of its ends, these ends being represented in Fig. 1 as 21 and 21', respectively. Thus when one car or hoist is elevated with a load the other car descends, but the device is equally adapted for a single car. As the wheels 17 and 19 rotate in opposite directions the engagement of the pinion 26 with one of the large wheels will rotate the drum in one direction, and when the pinion 26 is engaged with the other large wheel the direction of rotation of the drum will be reversed, these reversals being accomplished by swinging the lever 27. When the lever is engaged with the intermediate notch 40 on the quadrant a single car, or the heavier of two cars, may be lowered by brake-control.

Having thus described our invention we claim as new and desire to secure by Letters Patent—

1. The combination with a vertical shaft having a sweep on its lower end, of a pair of gear wheels movable in opposite directions by the upper end of said shaft, a drum shaft, a drum and a pinion keyed to said drum shaft, and means for engaging said pinion with either of said gear wheels.

2. The combination with a rotatable vertical shaft, of a gear wheel secured to the upper end of said shaft, a driven gear wheel in mesh with the first mentioned gear wheel, a pinion movable into mesh with either of said wheels, a drum shaft to which said pinion is secured, a drum secured to said drum shaft, and a rope wound on said drum, adapted to carry a car on each of its ends.

3. The combination with a vertical shaft, of a sweep on the lower and a gear wheel on the upper end of said shaft, a driven gear wheel meshing with said gear wheel and rotating in the opposite direction, a drum having a pinion connected therewith, a rope on said drum adapted to carry cars which move in opposite directions when said drum is rotated, a shifting lever on which said drum and pinion are mounted and by means of which said pinion is movable out of engagement with both said gear wheels or into engagement with either one of them, and a braking mechanism for controlling said drum when said pinion is out of mesh with both said gear wheels.

In testimony whereof we have hereunto set our hands in the presence of two subscribing witnesses.

JOHN A. ANDERSON.
OSCAR T. FERNGREN.

Witnesses:
JULIA M. BRISTOL,
J. W. BECKSTROM.

Copies of this patent may be obtained for five cents each, by addressing the "Commissioner of Patents, Washington, D. C."